United States Patent [19]

Dvorak

[11] Patent Number: 5,198,956
[45] Date of Patent: Mar. 30, 1993

[54] OVERTEMPERATURE SENSING AND SIGNALING CIRCUIT

[75] Inventor: Robert F. Dvorak, Mount Vernon, Iowa

[73] Assignee: Square D Company, Palatine, Ill.

[21] Appl. No.: 901,320

[22] Filed: Jun. 19, 1992

[51] Int. Cl.$^5$ ............................................. H02H 5/04
[52] U.S. Cl. ..................................... 361/106; 340/593
[58] Field of Search ................. 361/103, 106; 307/116; 340/584, 593

[56] References Cited

U.S. PATENT DOCUMENTS 4,360,852  11/1982  Gilmore ............................... 361/106

Primary Examiner—Todd E. DeBoer
Attorney, Agent, or Firm—Larry I. Golden; Kareem M. Irfan

[57] ABSTRACT

An overtemperature sensing and signaling circuit for electronic trip units includes a voltage divider (16) and a trigger circuit (18). The voltage divider is formed of a first resistor (R1) and a positive coefficient resistor (PT1). The trigger circuit is formed of a first bipolar transistor (Q1) of the PNP-type conductivity and a second bipolar transistor (Q2) of the NPN-type conductivity.

14 Claims, 1 Drawing Sheet

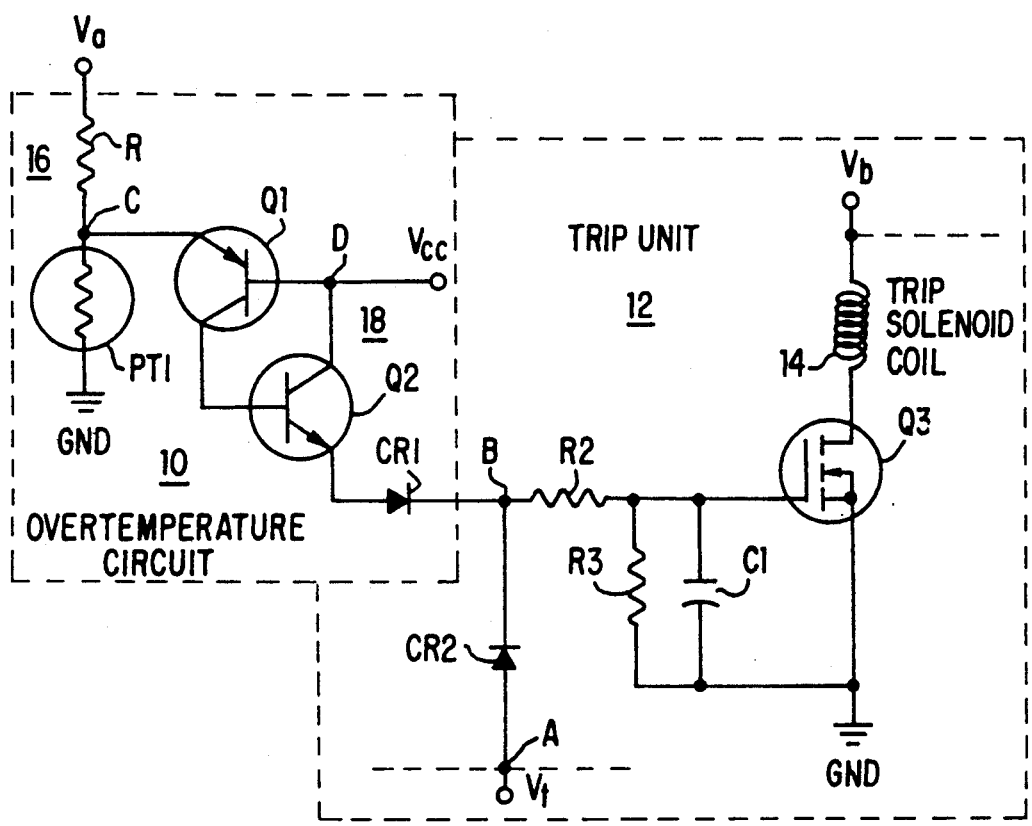

OVERTEMPERATURE SENSING AND SIGNALING CIRCUIT

BACKGROUND OF THE INVENTION

This invention relates generally to circuit interrupters having electronic trip units and more particularly, it relates to an overtemperature sensing and signaling circuit employed in circuit interrupters with electronic trip units for protecting the trip units from operating at an excessively high ambient temperature.

As is generally well-known in the art, circuit breakers have been widely used in commercial and industrial applications for protecting electrical conductors and apparatus connected thereto from damage due to excessive current flow. Circuit breakers typically included trip systems which were designed to interrupt when the current flowing through them exceeded a predetermined level. Specifically, most simple trip systems utilized an electromagnet to trip the circuit in response to abnormal current or voltage. The electromagnet provided a magnetic field in response to current flowing through the circuit breaker. When the current level increased beyond the predetermined level or trip point, the magnetic field "trips" a mechanism which causes a set of circuit breaker contacts to release, thereby "opening" or "breaking" the circuit path.

As tripping systems became more sophisticated and elaborate to meet the demands by industry for improved accuracy and flexibility, there were developed heretofore circuit interrupters which utilized electronic control circuits in the trip unit. Since these circuit interrupters were generally mounted in a molded case or housing, the ambient temperature could possibly increase beyond the rating of some of the electronic components used in the trip unit. This increased ambient temperature could be caused by the heat generated by the current being passed through the circuit interrupter. In any event, it is known that operating such electronic components beyond their rated temperatures will decrease significantly their product life-time and could even cause premature failure of the trip unit.

Accordingly, there has arisen a need for providing overtemperature protection for such circuit interrupters having electronic trip units. In the past, it was known in the prior art to provide thermally activated switches disposed within the housing enclosing the circuit interrupter and connected to the internal conductors thereof. Each of the thermal switches was formed of a bimetal element which closed the switch contacts when the temperature of the associated conductors rose above a predetermined temperature. When the conductors overheat, the trip unit connected in parallel with these switches caused the trip coil to energize for breaking the contacts of the circuit interrupter. Although these bimetal thermally activated switches achieved the protection function satisfactorily, they suffer from the disadvantages of being relatively large in size and high in cost.

Thus, the present invention is directed to an improved overtemperature sensing and signaling circuit which provides for more reliable operation and performance at a reduced cost. In particular, the overtemperature sensing and signaling circuit of the instant invention includes a voltage divider and a trigger circuit. The voltage divider is formed of a first resistor and a positive coefficient resistor. The trigger circuit is formed of a first bipolar transistor of the PNP-type conductivity and a second bipolar transistor of the NPN-type conductivity.

SUMMARY OF THE INVENTION

Accordingly, it is a general object of the present invention to provide an improved overtemperature sensing and signaling circuit for electronic trip units which is relatively simple and economical to manufacture and assemble, but yet overcomes the disadvantages of the prior art protection circuits.

It is an object of the present invention to provide an improved overtemperature sensing and signaling circuit for electronic trip units which has a high reliability in its operation.

It is another object of the present invention to provide an improved overtemperature sensing and signaling circuit for electronic trip units which is formed of components with relatively low cost.

It is still another object of the present invention to provide an improved overtemperature sensing and signaling circuit for electronic trip units which includes a voltage divider having a positive coefficient resistor and a trigger circuit formed of a first bipolar transistor of the PNP-type conductivity and a second bipolar transistor of the NPN-type conductivity.

In accordance with these aims and objectives, the present invention is concerned with the provision of an improved overtemperature sensing and signaling circuit for electronic trip units which includes a voltage divider and a trigger circuit. The voltage divider is formed of a first resistor and a positive coefficient resistor. The positive coefficient resistor is used to sense the ambient temperature within a circuit interrupter housing and is connected between a first node and a ground potential. The first resistor has its one end connected to a first power supply potential and its other end connected to the first node.

The trigger circuit is formed of a first switching transistor and a second switching transistor. The first switching transistor has its emitter connected to the first node. The second switching transistor has its base connected to the collector of the first switching transistor, its collector connected to the base of the first switching transistor and to a second power supply potential, and its emitter coupled to a second node.

BRIEF DESCRIPTION OF THE DRAWING

These and other objects and advantages of the present invention will become more fully apparent from the following detailed description when read in conjunction with the accompanying drawing in which there is shown a schematic circuit diagram of the overtemperature sensing and signaling circuit for carrying out the protection feature of the instant invention.

DESCRIPTION OF THE PREFERRED EMBODIMENT

Referring now in detail to the drawing of the particular illustration, there is shown a schematic circuit diagram of an improved overtemperature sensing and signaling circuit 10 of the present invention for use in association with an electronic trip unit 12 employed in a solid-state circuit interrupter. The overtemperature sensing and signaling circuit 10 serves to protect the trip unit from operating at an excessively high ambient temperature which could possibly shorten the product lifetime of the various electronic components used in the trip unit. Thus, the overtemperature sensing and signaling circuit is designed to energize a trip solenoid coil 14 for opening contactors so as to break the current path in the circuit interrupter when the ambient temperature in a housing enclosing the circuit interrupter rises above a predetermined level.

It should be noted that only the pertinent portions of the trip unit 12 which is necessary for the understanding of the operation of the present invention has been depicted in the drawing. It will also be understood that the trip unit 12 itself does not form any part of the present invention. Therefore, for the sake of clarity, many of the components of the trip unit 12 have been intentionally omitted from the drawing.

The trip unit 12 is shown to include a power N-channel field-effect transistor Q3 for energizing the trip solenoid coil 14 One end of the solenoid coil 14 is connected to a voltage source $V_b$, which is typically between +10.0 to +20.0 VDC. The other end of the solenoid coil is connected to the drain electrode of the transistor Q3. The source electrode of the transistor Q3 is connected to a ground potential GND. The resistor R2 and the capacitor C1 form a low-pass filter to reduce high frequency noise which could false trigger the transistor Q3. The resistor R3 provides a shunt to ground such that leakage current do not false trigger the transistor Q3. A trip voltage $V_t$ is generated at node A by portions of the trip unit circuitry that are not shown. The trip voltage $V_t$ is only generated under overcurrent conditions of sufficient magnitude and duration which indicates that a fault has occurred. This trip voltage $V_t$ is applied to the anode of the diode CR2 whose cathode is connected to the node B.

Under normal operating conditions, the trip voltage $V_t$ is near the ground potential and the transistor Q3 is thus rendered to be non-conductive. As a result, the trip solenoid coil 14 will not be energized and the contactors of the circuit interrupter will remain closed or latched, thereby allowing current to flow therethrough. However, when a fault is sensed by the trip unit circuitry, the trip voltage $V_t$ will be applied to the gate of the transistor Q3 via the diode CR2 and the resistor R2. Consequently, the transistor Q3 will be rendered conductive so as to cause the trip solenoid coil 14 to be energized. Once energized, the solenoid coil proceeds to open or break the contactors in the circuit interrupter and causes the current flowing in the internal conductors thereof to be interrupted.

In order to prevent the electronic components in the trip unit 12 from being damaged by being operated at beyond their rated temperatures, the overtemperature sensing and signaling circuit 10 of the instant invention is provided to generate an overtemperature trip signal for activating the solenoid coil so as to interrupt or break the current path. The overtemperature sensing and signaling circuit 10 is comprised of a voltage divider 16 and a trigger circuit 18.

The voltage divider is formed of a first resistor R1 and a second resistor PT1. One end of the first resistor is connected to a power source $V_a$ which is typically at 11.0 volts. The other end of the first resistor R1 is connected to one end of the second resistor PT1 and to an internal node C. The other end of the second resistor PT1 is connected to a ground potential GND. The second resistor PT1 is comprised of a positive coefficient resistor whose resistance value increases as the ambient temperature increases, thereby increasing the voltage at the internal node C.

The trigger circuit 18 includes a bipolar PNP-type switching transistor Q1 and a bipolar NPN-type switching transistor Q2. The transistor Q1 has its emitter connected to the junction of the first and second resistors at the node C, its base connected to the collector of the transistor Q2, and its collector connected to the base of the transistor Q2. The junction of the base of the transistor Q1 and the collector of the transistor Q2 is further connected to a node D for receiving a power source $V_{cc}$, which is typically at +5.0 volts.

A diode CR1 has its anode connected to the emitter of the transistor Q2 and its cathode connected to the second node B. The cathode of the diode CR1 provides an overtemperature trip signal for energizing the trip solenoid coil whenever the ambient temperature in the housing cavity exceeds a predetermined level.

The operation of the overtemperature sensing and signaling circuit 10 will now be explained. Under normal operating conditions, the temperature in the housing cavity containing the trip unit 12 will be within normal operating limits. Thus, the resistance value of the positive coefficient resistor PT1 will be relatively small, i.e., typically in the range of 100 to 1500 ohms, dependent upon the actual ambient temperature. Under this condition, the voltage at the node C will be low and the emitter-base junction of the transistor Q1 will be reverse biased. As a result, the transistors Q1 and Q2 both will be turned off so that no emitter current will flow through the diode CR1. The power field-effect transistor Q3 will also be rendered non-conductive, thereby maintaining the contactors of the circuit interrupter closed.

Now, assume that the ambient temperature of the housing cavity is elevated above the sense temperature of the positive coefficient resistor PT1. The resistance value of the second resistor PT1 will then increase rapidly proportional to the degrees of temperature rise. When the emitter voltage defining a turn-on signal of the transistor Q1 exceeds the power source $V_{cc}$ of +5.0 volts at its base by a voltage $V_{bc}$, the transistor Q1 will be turned on so as to pull up the base of the transistor Q2. Consequently, the transistor Q2 will also be rendered conductive. When the transistor Q2 turns on, the overtemperature trip signal at the node B will be nearly equal to the power source $V_{cc}$. This high voltage of the overtemperature trip signal will appear at the gate of the transistor Q3 and turns on the same. This, in turn, will engage the trip solenoid coil 14, thereby interrupting the current path in the circuit interrupter so as to protect the trip unit from being operated at an excessively high ambient temperature.

For completeness in disclosure of the above described overtemperature sensing and signaling circuit but not for the purposes of limitation, the following representative values and component identifications are submitted. These values and components were employed in the preferred embodiment of the invention described herein.

| PART | TYPE or VALUE |
| --- | --- |
| R1 | 10k ohms |
| PT1 | MURATA ERIE |
|  | Type PTH59F04BF222TS |
| Q1 | 2N3906 |
| Q2 | 2N3904 |
| CR1 | IN4148 |

From the foregoing detailed description, it can thus be seen that the present invention provides an improved overtemperature sensing and signaling circuit for electronic trip units which includes a voltage divider and a trigger circuit. The voltage divider includes a positive coefficient resistor. The trigger circuit is formed of a first bipolar transistor of the PNP-type conductivity and a second bipolar transistor of the NPN-type conductivity. The overtemperature circuit of the present invention provides for more reliable operation and performance at reduced cost than those traditionally available.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An overtemperature sensing and signaling circuit for electronic trip units comprising:
   a voltage divider (16) formed of a first resistor (R1) and positive coefficient resistance means (PT1) for sensing the ambient temperature within a circuit interrupter housing, said positive coefficient resistance means being connected between a first node (C) and a ground potential (GND), said first resistor (R1) having its one end connected to a first power supply potential ($V_a$) and its other end connected to said first node (C);
   a trigger circuit (18) formed of a first switching transistor (Q1) and a second switching transistor (Q2);
   said first switching transistor having its emitter connected to said first node (C); and
   said second switching transistor (Q2) having its base connected to the collector of said first switching transistor (Q1), its collector connected to the base of said first switching transistor (Q1) and to a second power supply potential ($_{cc}$), and its emitter coupled to a second node (B).

2. An overtemperature sensing and signaling circuit as claimed in claim 1, wherein said resistance means comprises a positive coefficient resistor.

3. An overtemperature sensing and signaling circuit as claimed in claim 1, wherein said first switching transistor (Q1) is a bipolar transistor of the PNP-type conductivity.

4. An overtemperature sensing and signaling circuit as claimed in claim 3, wherein said second switching transistor (Q2) is a bipolar transistor of the NPN-type conductivity.

5. An overtemperature sensing and signaling circuit as claimed in claim 1, wherein said voltage divider generates a turn-on signal to the emitter of said first switching transistor whenever the ambient temperature of said circuit interrupter housing exceeds a predetermined level to render said first and second switching transistors (Q1, Q2) to be conductive, thereby producing an overtemperature trip signal at the second node.

6. An overtemperature sensing and signaling circuit as claimed in claim 5, further comprising a trip solenoid coil which is energized in response to said overtemperature trip signal for interrupting a current path in a circuit interrupter so as to protect the trip unit from being operated at an excessively high ambient temperature.

7. An overtemperature sensing and signaling circuit as claimed in claim 1, further comprising a diode having its anode connected to the emitter of said second switching transistor (Q2) and its cathode connected to said second node (B).

8. An overtemperature sensing and signaling circuit for electronic trip units comprising:
   thermal-responsive means (PT1) for sensing the ambient temperature within a circuit interrupter housing;
   a trigger circuit (18) formed of a first switching transistor (Q1) and a second switching transistor (Q2);
   said first switching transistor having its emitter connected to said first node (C); and
   said second switching transistor (Q2) having its base connected to the collector of said first switching transistor (Q1), its collector connected to the base of said first switching transistor (Q1) and to a second power supply potential ($V_{cc}$), and its emitter coupled to a second node (B).

9. An overtemperature sensing and signaling circuit as claimed in claim 8, wherein said thermal-responsive means comprises a positive coefficient resistor.

10. An overtemperature sensing and signaling circuit as claimed in claim 8, wherein said first switching transistor (Q1) is a bipolar transistor of the PNP-type conductivity.

11. An overtemperature sensing and signaling circuit as claimed in claim 10, wherein said second switching transistor (Q2) is a bipolar transistor of the NPN-type conductivity.

12. An overtemperature sensing and signaling circuit as claimed in claim 8, wherein said thermal-responsive means generates a turn-on signal to the emitter of said first switching transistor whenever the ambient temperature of said circuit interrupter housing exceeds a predetermined level to render said first and second switching transistors (Q1, Q2) to be conductive, thereby producing an overtemperature trip signal at the second node.

13. An overtemperature sensing and signaling circuit as claimed in claim 12, further comprising a trip solenoid coil which is energized in response to said overtemperature trip signal for interrupting a current path in a circuit interrupter so as to protect the trip unit from being operated at an excessively high ambient temperature.

14. An overtemperature sensing and signaling circuit as claimed in claim 8, further comprising a diode having its anode connected to the emitter of said second switching transistor (Q2) and its cathode connected to said second node (B).

* * * * *